United States Patent
Choi

(10) Patent No.: US 8,023,602 B2
(45) Date of Patent: Sep. 20, 2011

(54) SERIAL DATA COMMUNICATION APPARATUS AND METHODS OF USING A SINGLE LINE

(75) Inventor: Jong-Sang Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 914 days.

(21) Appl. No.: 11/305,791

(22) Filed: Dec. 16, 2005

(65) Prior Publication Data

US 2006/0153326 A1    Jul. 13, 2006

(30) Foreign Application Priority Data

Jan. 11, 2005   (KR) .......................... 10-2005-002458

(51) Int. Cl.
*H04L 7/00* (2006.01)

(52) U.S. Cl. ........ 375/354; 375/355; 375/360; 375/364; 375/365; 375/369; 714/727; 714/775; 370/516

(58) Field of Classification Search .................. 375/219, 375/220, 222, 244, 246, 253, 254, 293, 354, 375/356, 359, 360, 361, 365, 375, 259, 260, 375/290, 316, 342, 350, 268, 294, 299, 322, 375/327, 340, 343, 345, 347, 355, 364, 368, 375/369, 371, 373; 714/775, 776
See application file for complete search history.

(56) References Cited

U.S. PATENT DOCUMENTS

| | | | | |
|---|---|---|---|---|
| 5,864,872 | A | 1/1999 | Lee et al. | 711/115 |
| 6,240,151 | B1* | 5/2001 | Ko | 375/370 |
| 6,697,897 | B1 | 2/2004 | Friel et al. | 710/105 |
| 6,711,697 | B1 | 3/2004 | Tanaka | 713/600 |
| 6,772,251 | B1* | 8/2004 | Hastings et al. | 710/100 |
| 6,807,598 | B2* | 10/2004 | Farmwald et al. | 710/305 |
| 7,366,267 | B1* | 4/2008 | Lee et al. | 375/354 |
| 7,471,752 | B2* | 12/2008 | Ge et al. | 375/354 |
| 7,509,562 | B1* | 3/2009 | Esposito et al. | 714/775 |
| 2004/0066860 | A1* | 4/2004 | Bois et al. | 375/316 |
| 2004/0210805 | A1* | 10/2004 | Kimelman et al. | 714/724 |
| 2005/0188206 | A1* | 8/2005 | Kwok | 713/176 |
| 2005/0193301 | A1* | 9/2005 | Partovi et al. | 714/727 |
| 2005/0207280 | A1* | 9/2005 | Fowler et al. | 368/10 |
| 2005/0286643 | A1* | 12/2005 | Ozawa et al. | 375/242 |
| 2006/0072251 | A1* | 4/2006 | Ross et al. | 361/1 |

FOREIGN PATENT DOCUMENTS

KR    100240250 B1    10/1999

* cited by examiner

*Primary Examiner* — Shuwang Liu
*Assistant Examiner* — Hirdepal Singh
(74) *Attorney, Agent, or Firm* — Myers Bigel Sibley & Sajovec

(57) ABSTRACT

Serial data communication methods and apparatus using a single line are provided. The data communication methods may include: setting a rising edge of a serial pulse signal so that a cycle of the serial pulse signal begins therefrom; setting a falling edge of the serial pulse signal within the cycle of the serial pulse signal according to a data value recorded within the cycle of the serial pulse signal; and transmitting a packet formed by combining at least one cycle of the serial pulse signal in series via a single line.

26 Claims, 8 Drawing Sheets

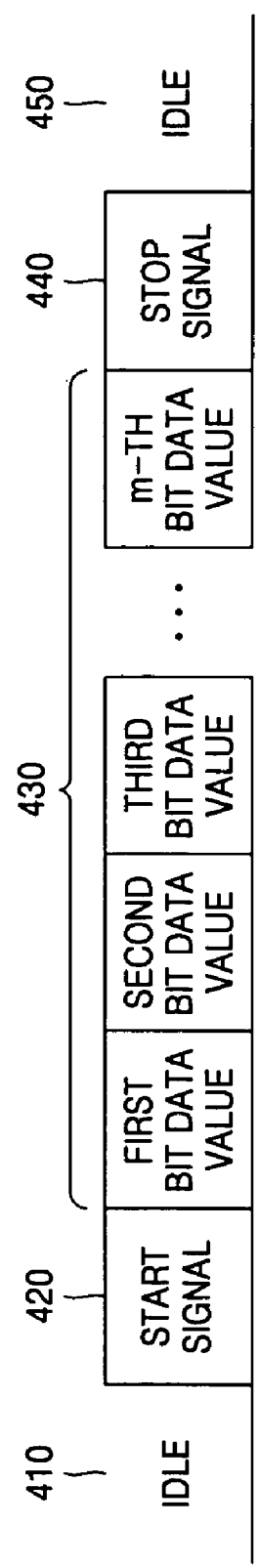

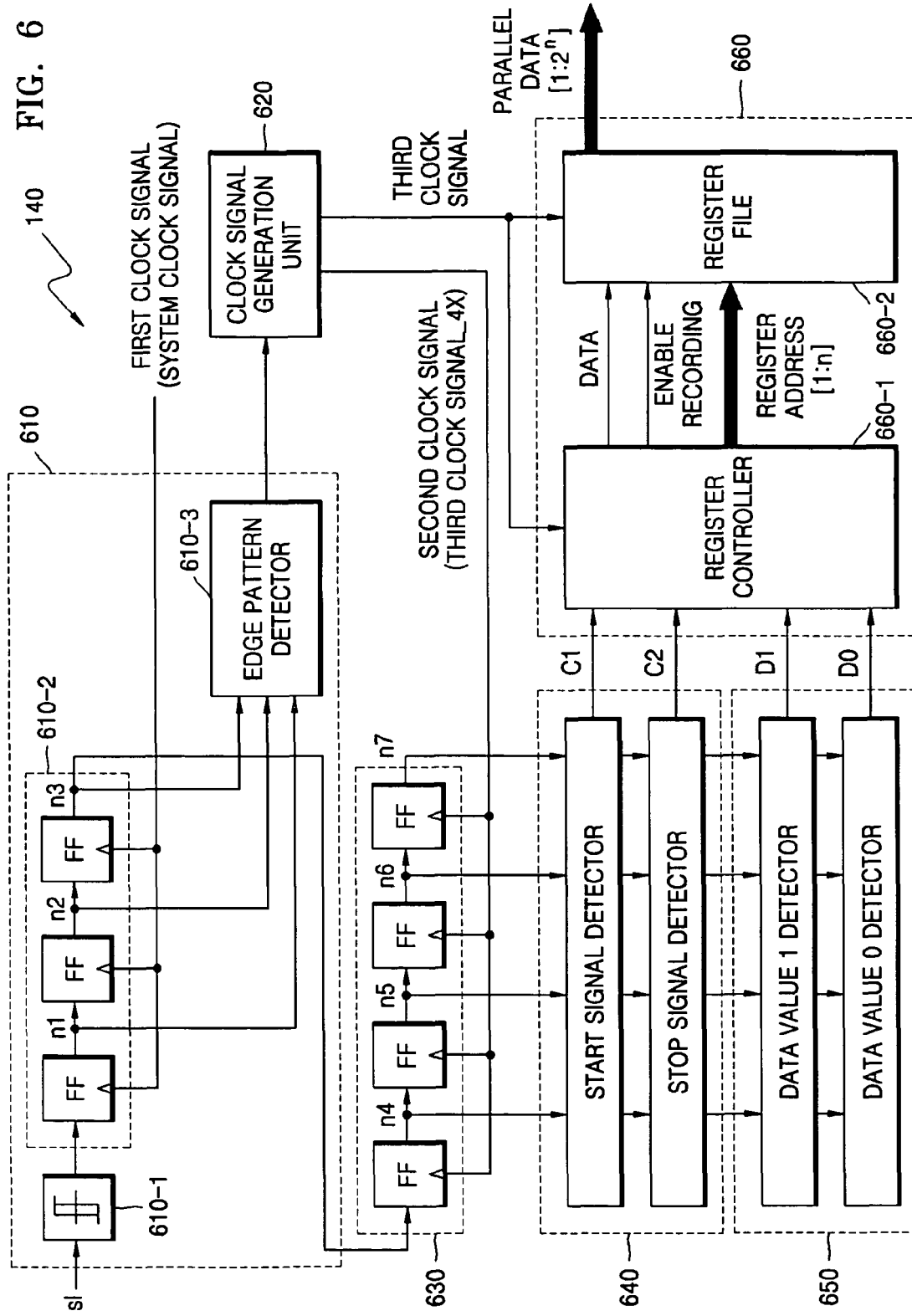

SERIAL DATA COMMUNICATION APPARATUS AND METHODS OF USING A SINGLE LINE

CROSS-REFERENCE TO RELATED APPLICATION

This application claims priority under 35 U.S.C. §119 from Korean Patent Application No. 10-2005-0002458, filed on Jan. 11, 2005, in the Korean Intellectual Property Office, the disclosure of which is incorporated by reference herein as if set forth in its entirety.

FIELD OF THE INVENTION

The present invention relates to data communication systems and, more particularly, to serial data communication systems and related methods.

BACKGROUND OF THE INVENTION

In general, data communication systems that include a master and a slave may be classified as either high-speed communication systems or as low-speed communication systems. Low-speed communication systems are generally used, for example, to set a register or to turn on/off a hand-held device.

One type of bus used in low-speed communication systems is an inter-integrated circuit (I2C) bus. An I2C network is a small-sized network established by connecting integrated circuits (ICs) and other electronic systems using an I2C bus.

In an I2C network, a master generates a start signal and a stop signal, thereby initiating communication. The master generates a clock signal, transmits slave addresses, and determines a direction in which data is to be transmitted. An example of the master is a central processing unit (CPU). An I2C bus may be comprised of two lines: a serial clock line (SCL) and a serial data line. The I2C bus carries out serial data communications using these lines.

A considerable number of devices may be connected to an I2C bus waiting for their turn to communicate. The devices are in a slave state when the I2C bus is inactivated. In the slave state, the devices are able to make a response to the master when addressed by the master.

SUMMARY OF THE INVENTION

Pursuant to embodiments of the present invention, methods of transmitting a clock signal and a data signal via a single communication line are provided in which a serial pulse signal is transmitted over the single communication line. In these methods, the clock signal is embedded in the serial pulse signal as at least some of the rising edges or the falling edges of the serial pulse signal. The data signal is likewise embedded in the serial pulse signal, and may be embedded based on the locations of other of the rising edges and/or the falling edges of the serial pulse signal.

In these methods, the data signal may comprise digital data and/or a control signal. The digital data may comprise, for example, a value of one or a value of zero, and the control signal may comprise a start signal or a stop signal. The clock signal may comprise the rising edge of the serial pulse signal in each cycle of the serial pulse signal, and the different possible data values of the data signal may be identified based on the locations of the falling edges of the serial pulse signal.

The serial pulse signal may be generated by a master device and transmitted via the single communication line to a slave device.

Pursuant to further embodiments of the present invention, methods of transmitting a clock signal and a data signal via a serial pulse signal over a single communication line may be provided in which at least some of the cycles of the serial pulse signal are subdivided into a plurality of sub-intervals. Data that comprises part of the data signal is embedded in a first group of the plurality of sub-intervals of each of the subdivided cycles of the serial pulse signal, and the clock signal is embedded in a second group of the plurality of sub-intervals of each of the subdivided cycles of the serial pulse signal. The serial pulse signal with the embedded data and embedded clock signal is then transmitted over the single communication line.

In these methods, the data embedded in each of the subdivided cycles of the serial pulse signal may comprise one data bit or one control signal. The data signal may be embedded, for example, in the second and third sub-intervals of each of the subdivided cycles of the serial pulse signal. The clock signal may be embedded by transitioning the pulse signal between a low state and a high state at the beginning of a specific sub-interval of each cycle of the serial clock signal. For example, the clock signal may be embedded as a transition between a low state and a high state at the beginning of the first sub-interval.

Pursuant to still further embodiments of the present invention, methods of receiving data communications embedded in a serial pulse signal transmitted over a single communication line are provided. Pursuant to these methods, a clock signal is extracted from the received serial pulse signal based on the detected cycle of a serial pulse signal. A data signal is likewise extracted from the received serial pulse signal based on the values of the received serial pulse signal during one or more of a plurality of subintervals of each cycle of the received serial pulse signal.

In these methods, the data signal may comprise a start signal, followed by a plurality of binary data signals, followed by a stop signal. The clock signal may be extracted from the received serial pulse signal by detecting a rising edge of the serial pulse signal that corresponds to the beginning of each cycle of the serial pulse signal. The data signal may be extracted from the received serial pulse signal by generating a second clock signal the state of which varies whenever a predetermined number of pulses of a first clock signal are counted subsequent to detection of the beginning of a cycle of the serial pulse signal. A predetermined number of sample values are also generated from each cycle of the serial pulse signal in response to the second clock signal. The, data values and/or control signals embedded in each respective cycle of the received serial pulse signal are extracted or "determined" based on the generated sample values.

Pursuant to still further embodiments of the present invention, data communication apparatus for receiving a clock signal and a data signal via a single communication line are provided which include a clock cycle extraction unit that extracts a clock signal from a serial pulse signal received over the single communication line and a data extraction unit that extracts a data signal from the serial pulse signal received over the single communication line. The clock cycle extraction unit may comprise, for example, an edge detection unit which is configured to detect a rising edge of a serial pulse signal. The data extraction unit may comprise, for example, a clock signal generation unit which is configured to generate a clock signal whose state varies whenever a predetermined number of pulses of an external clock signal are counted after the rising edge of the serial pulse signal is detected, and may also include a sampling unit that is configured to generate a predetermined number of sample values from a cycle of the serial pulse signal in response to the generated clock signal. The data extraction unit may further include a data value detection unit that is configured to detect a data value recorded within the cycle of the serial pulse signal based on the sample values.

Pursuant to still further embodiments of the present invention, data communication methods are provided in which at least one cycle of a serial pulse signal is transmitted in series via a single line, where a rising edge of the serial pulse signal is set to designate the beginning of the cycle of the serial pulse signal and a falling edge of the serial pulse signal within the cycle of the serial pulse signal is set according to a data value recorded within the cycle of the serial pulse signal.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIG. 4 is a diagram illustrating the format of a packet generated using the methods of FIG. 2;

FIG. 6 is a more detailed block diagram illustrating the data communication apparatus of FIG. 5 according to some embodiments of the present invention;

DETAILED DESCRIPTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

Figure 1:
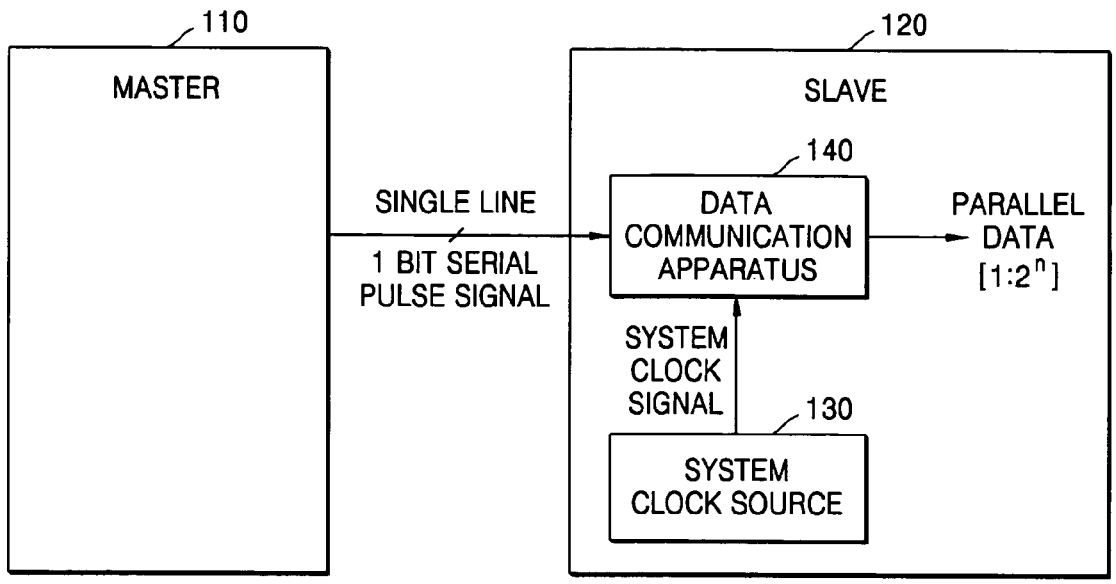
FIG. 1 is a block diagram illustrating data communication systems according to an embodiment of the present invention.

FIG. 1 is a block diagram illustrating data communication systems having a data communication apparatus 140 according to embodiments of the present invention. As shown in FIG. 1, the data communication system includes a master 110 and a slave 120. The master 110 may transmit a serial pulse signal to the slave 120 via a single line.

The slave 120 includes a system clock source 130 and the data communication apparatus 140. The system clock source 130 reconstructs a clock signal. The system clock source 130 may be extracted, for example, from a phase-locked loop (PLL), a delay locked loop (DLL), an external reference crystal oscillator of the slave 120, or another source. The system clock source 130 generates a system clock signal, which is an internal clock signal to the slave 120, but is an external clock signal to the data communication apparatus 140.

The serial pulse signal may include a control signal and a data value. The frequency of the system clock signal is generally higher than the frequency of the serial pulse signal. Accordingly, it is possible to over-sample the serial pulse signal using the system clock signal.

The data communication apparatus 140 receives the serial pulse signal. Parallel data, into which data embedded in the serial pulse signal is converted, may be generated based on the output of the data communication apparatus 140.

Figure 2:
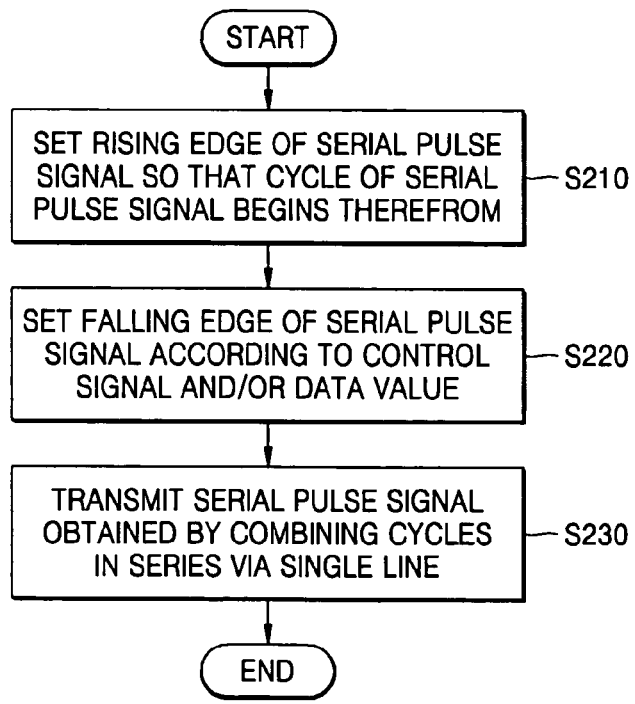
FIG. 2 is a flowchart illustrating methods of generating a serial pulse signal, which may be used in data communication methods according to embodiments of the present invention.

FIG. 2 is a flowchart illustrating a method of generating a serial pulse signal, which may be used in data communication methods according to exemplary embodiments of the present invention. Referring to FIGS. 1 and 2, in operation S210, the master 110 sets a rising edge of the serial pulse signal so that a cycle of the serial pulse signal begins therefrom.

In operation S220, the master 110 sets a falling edge of the serial pulse signal at a predetermined location in the cycle of the serial pulse signal based on a "data signal" recorded or "embedded" in the cycle of the serial pulse signal. The data signal may comprise a control signal and/or a data value. Thus, the location of the falling edge of the serial pulse signal may change based on whether the information embedded in the cycle of the serial pulse signal comprises, for example, a data value of 0, a data value of 1, a start signal, or a stop signal.

A packet of the serial pulse signal is formed by combining a plurality of cycles of the serial pulse signal, including, for example, a cycle recording the start signal, a plurality of cycles including data values of 0 or 1 that comprise the data, and a cycle recording a stop signal. In operation S230, the master 110 transmits the generated packet to the slave 120 via a single line.

Figure 3A:
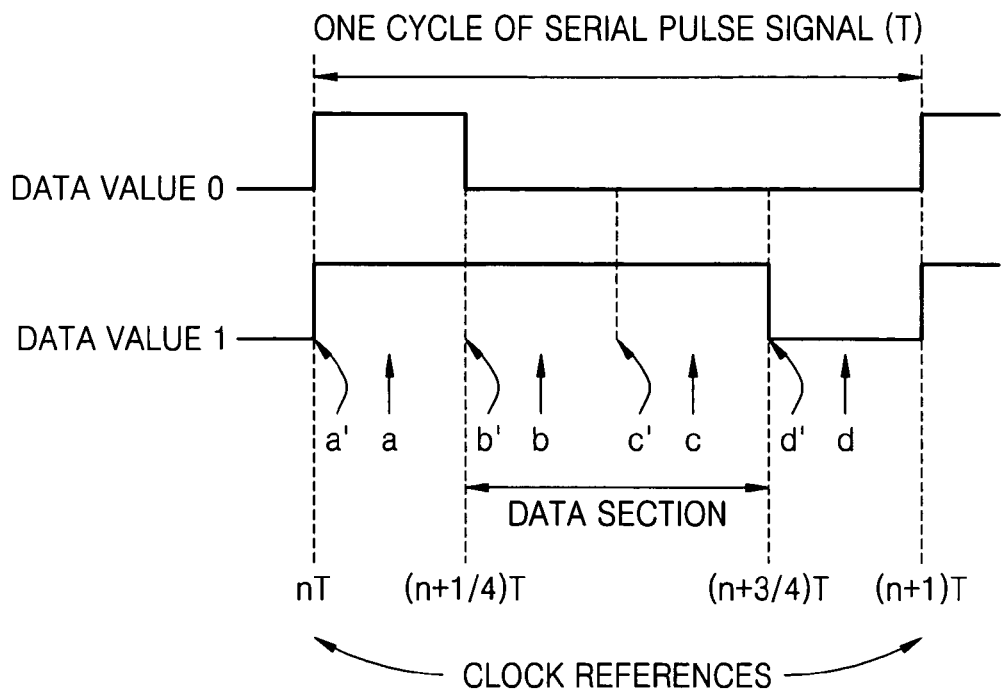
FIGS. 3A and 3B are timing diagrams illustrating cycles of a serial pulse signal generated using methods of FIG. 2.
Figure 3B:
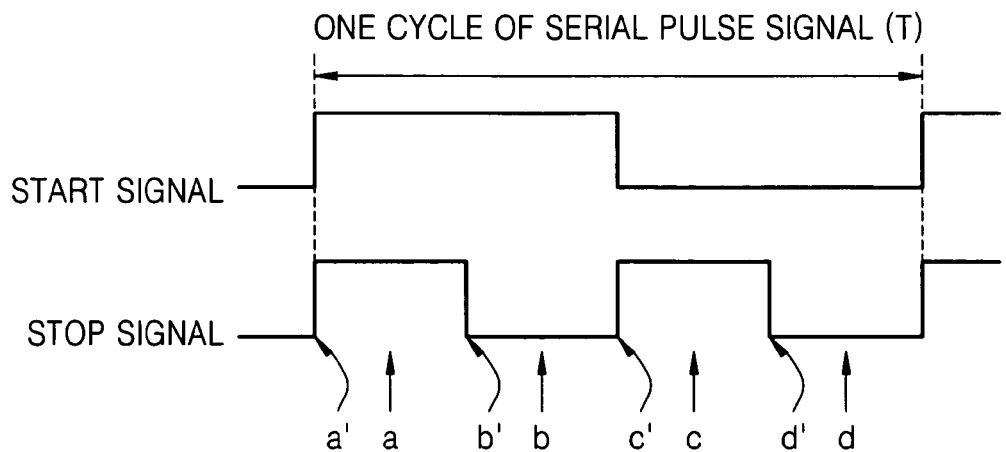

FIGS. 3A and 3B are diagrams illustrating one cycle T of a serial pulse signal generated, for example, using the method of FIG. 2. In the exemplary embodiment of FIGS. 3A and 3B, the cycle T of a serial pulse signal is divided into four sections a, b, c, and d whose beginning points are a', b', c' and d', respectively.

In some embodiments of the present invention, the master 110 sets the rising edge of the serial pulse signal at a' so that the cycle T of the serial pulse signal begins at a'. If a data value of 0 is to be embedded in the cycle T of the serial pulse signal, the master 110 sets a falling edge of the serial pulse signal at b'. On the other hand, if a data value of 1 is to be embedded in the cycle T of the serial pulse signal, the master 110 sets the falling edge of the serial pulse signal at d'.

As shown in FIG. 3B, the cycle of recording a control signal is different from a cycle of recording a data value. For example, in a specific embodiment of the present invention, the master 110 may record a start signal in a cycle T of the serial pulse signal by setting the falling edge of the serial pulse signal at c'. Likewise, the master 110 may record a stop signal within a cycle T of the serial pulse signal by setting the falling edge of the serial pulse signal at b' and at d'.

In some embodiments of the present invention, the slave 120 detects the rising edge of the received serial pulse signal at a'. The slave 120 uses the detected rising edge of the serial pulse signal as a clock reference. The slave 120 generates clock signals such as, for example, second and third clock signals, when the rising edge of the serial pulse signal is detected.

In certain embodiments of the present invention, the frequency of the second clock signal is four times higher than the frequency of the serial pulse signal, and the frequency of the third clock signal is the same as the frequency of the serial pulse signal. The slave 120 can generate the second and third clock signals using the system clock signal of FIG. 1 which, as noted above, may have a higher frequency than the serial pulse signal.

The slave 120 samples the serial pulse signal in response to the second clock signal, thereby obtaining four sample values a, b, c, and d.

In some embodiments of the present invention, the data value recorded within the cycle T of the serial pulse signal can be extracted by monitoring the sample values b and c. If both of the sample values b and c are 0, the data value recorded within the cycle T of the serial pulse signal is 0 as shown in FIG. 3A. If, on the other hand, both of the sample values b and c are 1, the data value recorded within the cycle T of the serial pulse signal is 1 (see FIG. 3A). If the sample value b is 1 and the sample value c is 0, the control signal recorded within the cycle T of the serial pulse signal is a start signal. If the sample value b is 0 and the sample value c is 1, the control signal recorded within the cycle T of the serial pulse signal is a stop signal. It will be understood that numerous other data and control signal encoding schemes may be used, and that the cycle T of the serial pulse signal may be divided into more than, or less than, 4 intervals.

The sample values a, b, c, and d may be sequentially combined to form a pattern. If the pattern is 1000, i.e., if the sample value a is 1 and the sample values b, c, and d are 0, the data value recorded within the cycle T of the serial pulse signal is 0. If the pattern is 1110, i.e., if the sample values a, b, and c are 1 and the sample value d is 0, the data value recorded within the cycle T of the serial pulse signal is 1. If the pattern is 1100, the control signal recorded within the cycle T of the serial pulse signal is a start signal. If the pattern is 1010, the control signal recorded within the cycle T of the serial pulse signal is a stop signal.

FIG. 4 is a diagram illustrating the format of a packet generated using the method of FIG. 2. As shown in FIG. 4, the serial pulse signal is grounded in an idle state at 410 and 450. The cycle of the serial pulse signal having an embedded start signal occurs at 420, prior to the cycles of the serial pulse signal that include m bits of data 430. The cycles of the serial pulse signal that include the m bits of data (430) are followed by a cycle that includes the stop signal 440.

Figure 5:
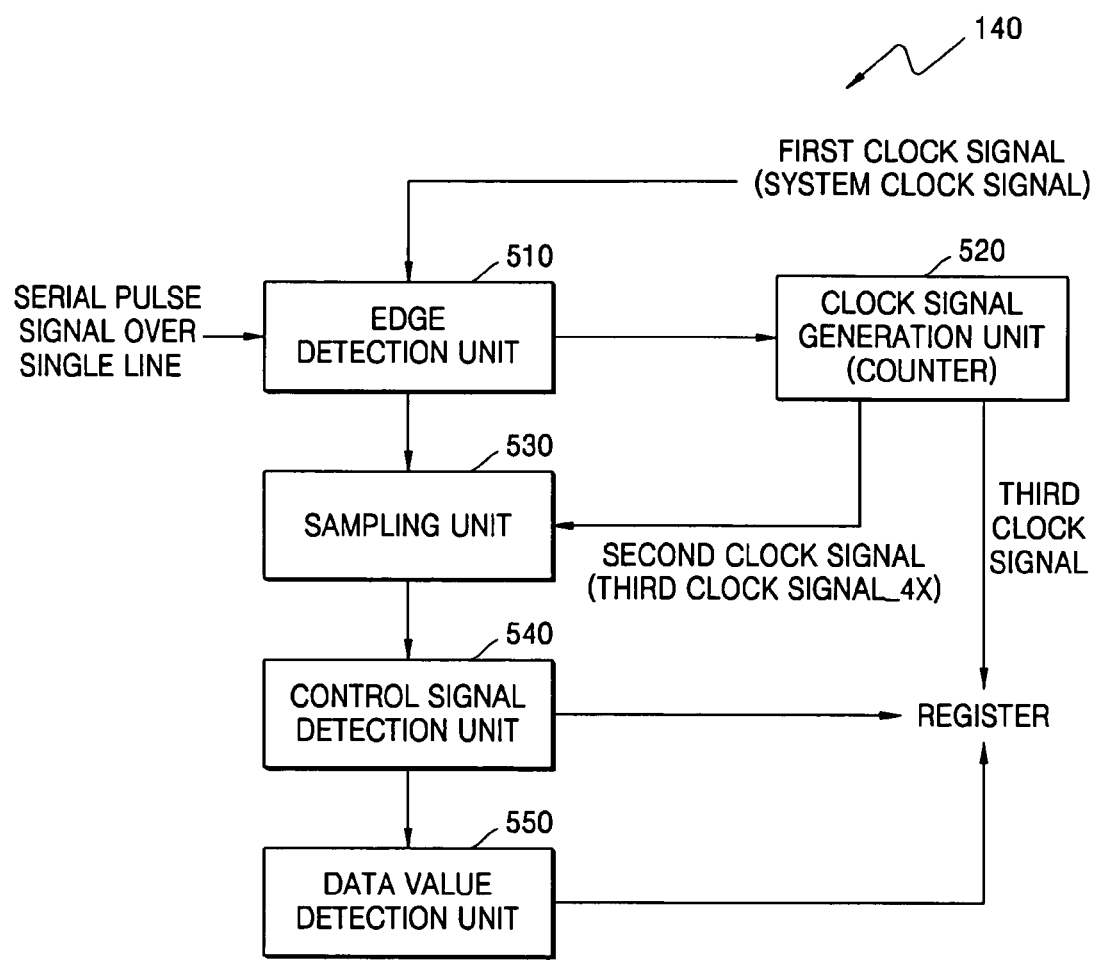
FIG. 5 is a block diagram illustrating the data communication apparatus of FIG. 1 according to certain embodiments of the present invention.

FIG. 5 is a block diagram of some embodiments of the data communication apparatus 140 of FIG. 1. As shown in FIG. 5, the data communication apparatus 140 includes an edge detection unit 510, a clock signal generation unit 520, a sampling unit 530, a control signal detection unit 540, and a data value detection unit 550.

The data communication apparatus 140 receives a serial pulse signal over a single line which may be generated, for example, using the method of FIG. 2. The edge detection unit 510 detects a rising edge of the serial pulse signal received by the data communication apparatus 140. The edge detection unit 510 samples the serial pulse signal in response to the system clock signal of FIG. 1, i.e., a first clock signal, thereby generating sample values. The edge detection unit 510 detects the rising edge of the serial pulse signal based on the sample values.

When the rising edge of the serial pulse signal is detected, the clock signal generation unit 520 generates a second clock signal and a third clock signal. The clock signal generation unit 520 uses the detected rising edge of the serial pulse signal as a reference for the second and third clock signals. The states of the second and third clock signals vary whenever a predetermined number of pulses of an external clock signal are counted.

In this embodiment of the present invention, the frequency of the second clock signal is four times higher than the frequency of the serial pulse signal. In other words, the cycle of the serial pulse signal is four times longer than the cycle of the second clock signal. Accordingly, the second clock signal has four pulses within one cycle of the serial pulse signal. In this embodiment of the present invention, the frequency of the third clock signal is the same as the frequency of the serial pulse signal.

The sampling unit 530 samples the serial pulse signal in response to the second clock signal, thereby generating sample values. Since the cycle of the serial pulse signal is four times longer than the cycle of the second clock signal, four sample values, i.e., a, b, c, and d of FIG. 3A or 3B, are obtained within one cycle of the serial pulse signal.

The control signal detection unit 540 detects a control signal recorded within the cycle of the serial pulse signal based on the sample values a, b, c, and d. The data value detection unit 550 likewise detects a data value recorded within the cycle of the serial pulse signal based on the sample values a, b, c, and d. The sample values a, b, c, and d are sequentially combined, thereby forming a pattern. In one particular embodiment of the present invention, the start signal corresponds to a pattern of 1100, a stop signal corresponds to a pattern of 1010, a data value of 1 corresponds to a pattern of 1110, and a data value of 0 corresponds to a pattern of 1000.

The sampling unit 530 obtains the sample values a, b, c, and d within one cycle of the serial pulse signal. The control signal detection unit 540 determines whether the pattern obtained by sequentially combining the sample values a, b, c, and d has a value of 1100 or 1010. If the pattern has a value of 1100, the control signal detection unit 540 detects a start signal. If the pattern has a value of 1010, the control signal detection unit 540 detects a stop signal.

The data value detection unit 550 determines whether the pattern has a value of 1110 or 1000. If the pattern has a value of 1110, the data value detection unit 550 detects a data value of 1. If the pattern has a value of 1000, the data value detection unit 550 detects a value of 0.

If the control signal detection unit 540 detects a start signal, a data value detected afterwards by the data value detection unit 550 is recorded in a register. If the control signal detection unit 540 detects a stop signal, the recording of the detected data value is stopped.

FIG. 6 is a block diagram of an exemplary implementation of the data communication apparatus 140 illustrated in FIG. 5. As shown in FIG. 6, the edge detection unit 610 includes a Schmidt trigger 610-1, three flipflops 610-2, and an edge pattern detector 610-3.

The edge detection unit 610 receives the first clock signal of FIG. 5, i.e., the system clock signal of FIG. 1. The frequency of the first clock signal may be higher than the frequency of a serial pulse signal. The serial pulse signal may have a gentler edge slope than the first clock signal. Accordingly, the edge detection unit 610 may pass the serial pulse signal through the Schmidt trigger 610-1. The Schmidt trigger 610-1 may be used to increase (i.e., make more steep) the edge slope of the serial pulse signal.

Thereafter, the edge detection unit 610 sequentially passes the serial pulse signal through the three flipflops 610-2. The first clock signal is applied to the three flipflops 610-2, and three sample values n3, n2, and n1 are obtained from the serial pulse signal in response to the first clock signal.

The three sample values n3, n2, and n1 are sequentially combined to form a pattern. A rising edge pattern of the serial pulse signal does not have a value of '01' but has a value of '011' (n3=0, n2=n1=1) or '001' (n3=n2=0, n1=1). Accordingly, it is possible to reduce/minimize incorrect detection of the rising edge of the serial pulse signal due to meta-stability at locations where the sample values n3, n2, and n1 are extracted.

The three sample values n3, n2, and n1 are input to the edge pattern detector 610-3. The edge-pattern detector 610-3 detects the rising edge of the serial pulse signal based on the three sample values n3, n2, and n1.

The function of the edge pattern detector 610-3 is characterized by "AND(~n3, n2, n1)" or "AND(~n3, ~n2, n1)". In other words, the edge pattern detector 610-3 determines whether the pattern obtained by sequentially combining the three sample values n3, n2, and n1 has a value of 011 or 001.

If the edge pattern detector 610-3 detects the rising edge of the serial pulse signal, the clock signal generation unit 620 generates a second clock signal and a third clock signal, which have been described above with reference to FIG. 5.

The clock signal generation unit 620 uses the rising edge of the serial pulse signal detected by the edge pattern detector 610-3 as a clock reference.

Thereafter, the serial pulse signal output from the edge detection unit 610 is input to the sampling unit 630. The sampling unit 630 obtains four sample values n7, n6, n5, and n4 from the serial pulse signal in response to the second clock signal. The sampling unit 630 includes four flipflops, which generate the four sample values n7, n6, n5, and n4 when the second clock signal is applied.

A control signal detection unit 640 includes a start signal detector and a stop signal detector. The start signal detector detects a start signal recorded within a predetermined cycle of the serial pulse signal based on the sample values n7, n6, n5, and n4 obtained by the sampling unit 630. The frequency of the second clock signal is four times higher than the frequency of the serial pulse signal. Accordingly, up to four sample values can be obtained from each cycle of the serial pulse signal.

The start signal detector detects a start signal C1 based on the sample values n7, n6, n5, and n4. The function of the start signal detector is characterized by "AND(n7, n6, ~n5, ~n4)". In other words, if a pattern obtained by sequentially combining the sample values n7, n6, n5, and n4 is 1100, the start signal detector detects the start signal C1.

The stop signal detector detects a stop signal C2 based on the sample values n7, n6, n5, and n4. The function of the stop signal detector is characterized by AND(n7, ~n6, n5, ~n4). In other words, if the pattern obtained by sequentially combining the sample values n7, n6, n5, and n4 is 1010, the stop signal detector detects the stop signal C2.

A data value detection unit 650 includes a data value 1 detector and a data value 0 detector.

The data value 1 detector detects a data value D1 of 1 based on the sample values n7, n6, n5, and n4. The function of the data value 1 detector is characterized by AND(n7, n6, n5, ~n4): In other words, if the pattern obtained by sequentially combining the sample values n7, n6, n5, and n4 is 1110, the data value 1 detector detects a data value D1 of 1.

The data value 0 detector detects a data value D0 of 0 based on the sample values n7, n6, n5, and n4. The function of the data value 0 detector is characterized by AND(n7, ~n6, ~n5, ~n4). In other words, if the pattern obtained by sequentially combining the sample values n7, n6, n5, and n4 is 1000, the data value 0 detector detects a data value D0 of 0.

A register 660 includes a register controller 660-1 and a register file 660-2. The third clock signal generated by the clock signal generation unit 620 is input to the register controller 660-1 and to the register file 660-2.

The third clock signal uses the rising edge of the serial pulse signal as a clock reference and has the same frequency as the serial pulse signal. Accordingly, the register 660 may obtain the control signal C1 or C2 or the data value D0 or D1 detected in one cycle.

The register controller 660-1 enables or disables the recording of data values detected from the serial pulse signal into the register file 660-2 depending on whether the control signal detection unit 640 has detected the start signal C1 or the stop signal C2. In other words, if the start signal C1 is detected from the serial pulse signal in response to the third clock signal, the register controller 660-1 enables the recording of the detected data values into a portion of the register file 660-2. However, if the control signal C2 is detected from the serial pulse signal in response to the third clock signal, the register controller 660-1 disables the recording of the detected data values into the register file 660-2.

In addition, if the data value D1 or D0 is detected from the serial pulse signal in response to the third clock signal, the register controller 660-1 records the detected data value into the portion of the register file 660-2 designated by the predetermined register address.

Figure 7A:
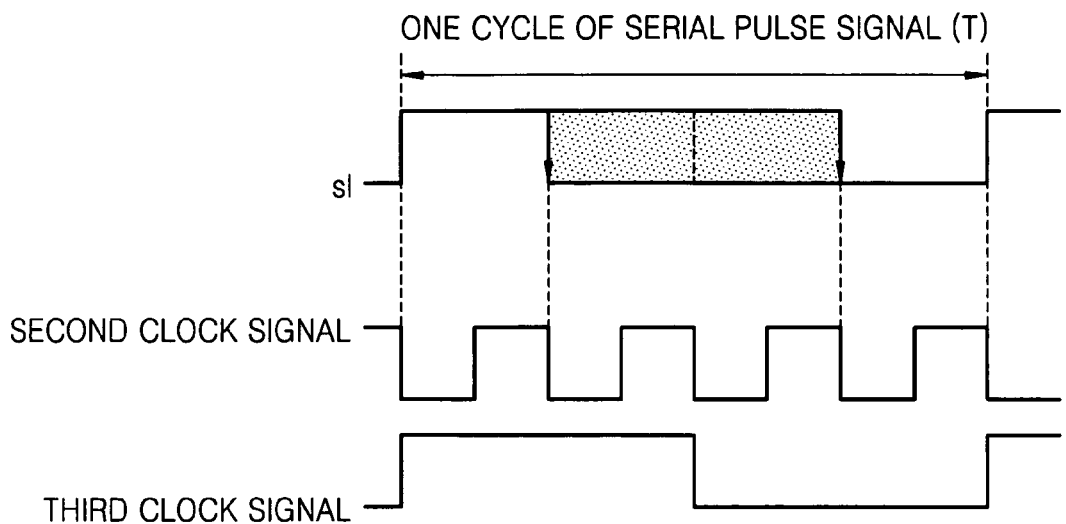
FIG. 7A is a timing diagram illustrating timings of the second and third clock signals of FIGS. 5 and 6 according to some embodiments of the present invention.

FIG. 7A is a timing diagram illustrating the second and third clock signals of FIG. 5 or 6. Referring to FIG. 7A, the cycle of the second clock signal is one fourth of the cycle of a serial pulse signal, and the cycle of the third clock signal is the same as the cycle of the serial pulse signal.

Figure 7B:
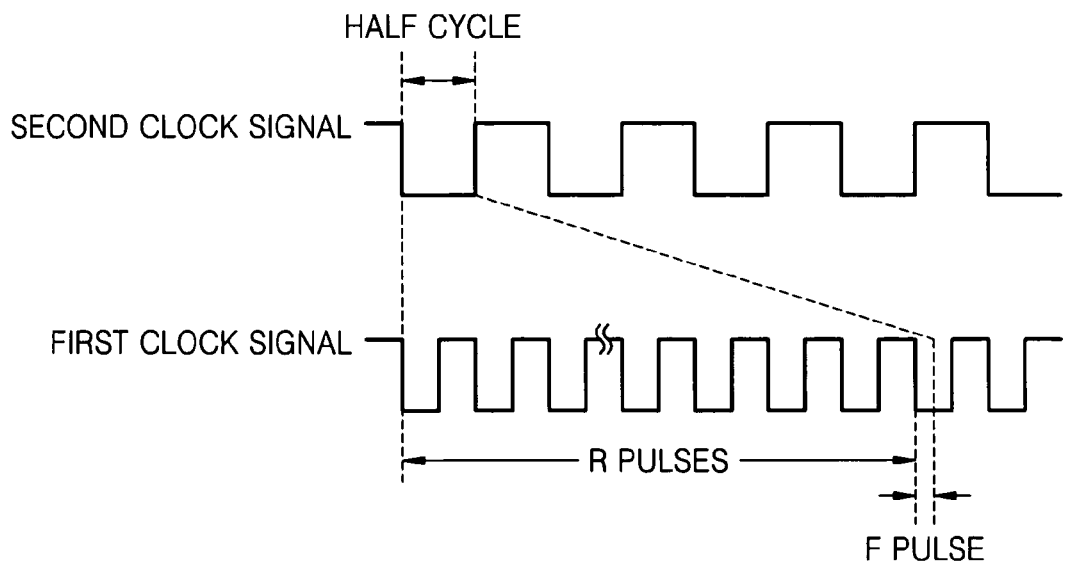
FIG. 7B is a diagram illustrating relationships between the first and second clock signals of FIGS. 5 and 6 according to some embodiments of the present invention.

FIG. 7B is a timing diagram illustrating the relationship between the first and second clock signals of FIG. 5 or 6. As shown in FIG. 7B, the frequency of the first clock signal may be much higher than the frequency of the second clock signal. The clock signal generation unit 520 of FIG. 5 may generate the second clock signal so that half of the cycle of the second clock signal has the same period as (R+F) pulses of the first clock signal where R is an integer and F is a decimal fraction smaller than 1.

The data communication apparatus 140 of FIG. 1 receives the first clock signal and generates the second clock signal based on the first clock signal. The first clock signal need not be exclusive to the data communication apparatus 140 and, for example, may be a system clock signal. Accordingly, one pulse of the second clock signal may not exactly correspond to R pulses of the first clock signal, and thus, the clock signal generation unit 520 generates the second clock signal so that one pulse of the second clock signal corresponds to (R+F) pulses of the first clock signal.

The clock signal generation unit 520 may generate the second clock signal so that (R+F) pulses of the first clock signal can be counted during one pulse of the second clock signal. However, for the economical realization of hardware, the clock signal generation unit 520 may generate the second clock signal so that one pulse of the second clock signal corresponds to R pulses of the first clock signal.

In certain embodiments of the present invention, one pulse of the second clock signal may have the same period as (R+F) pulses of the first clock signal. In other embodiments, one pulse of the second clock signal may have the same period as R pulses of the first clock signal. Since the frequency of the first clock signal may be much higher than the frequency of the second clock signal, the difference in the frequency of the second clock signal when one pulse of the second clock signal has the same period as R pulses of the first clock signal and when one pulse of the second clock signal has the same period as (R+F pulses) of the second clock signal may not be significant.

Figure 8:
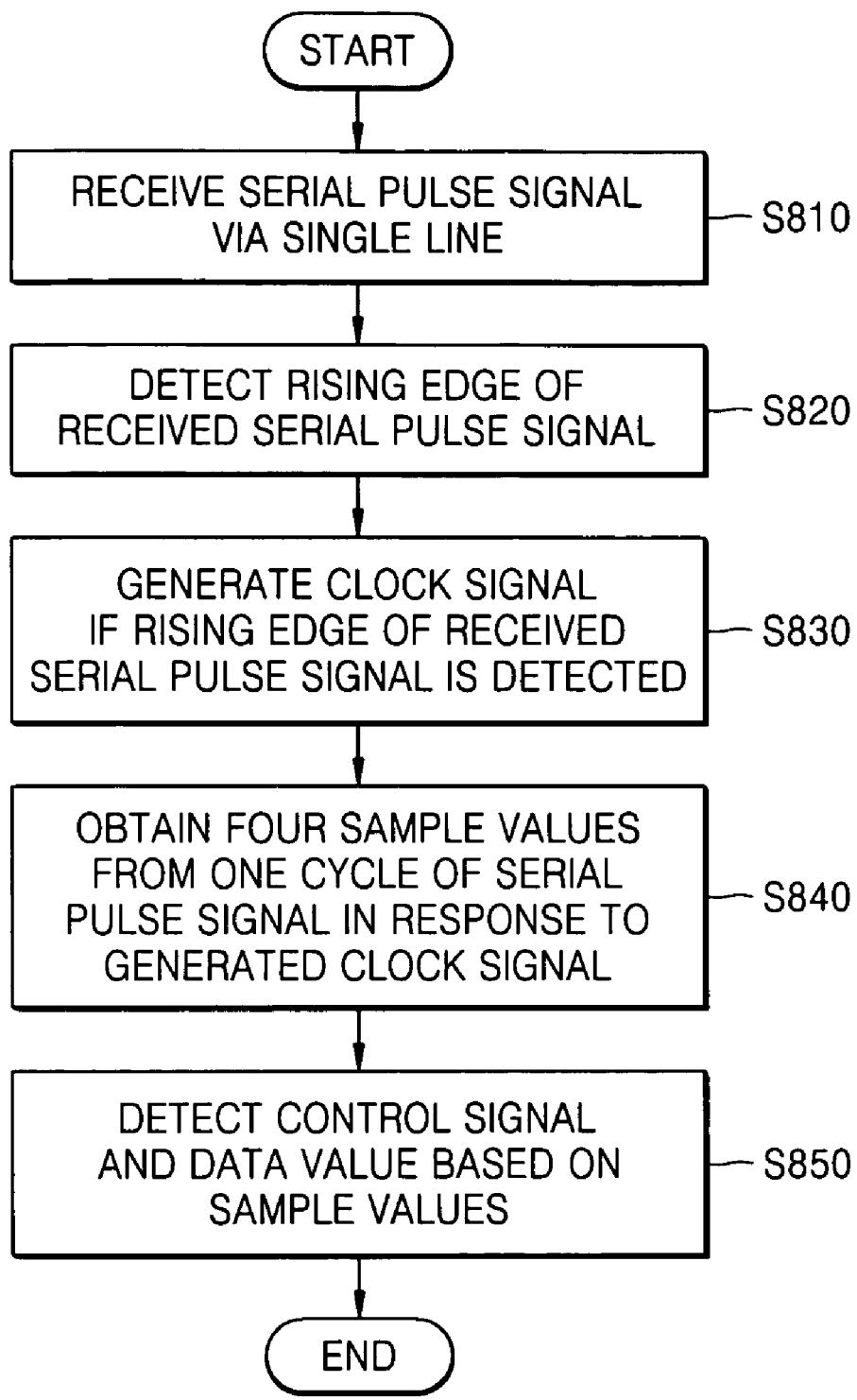
FIG. 8 is a flowchart illustrating methods of detecting a control signal and a data value from a serial pulse signal generated using the methods of FIG. 2 according to embodiments of the present invention.

FIG. 8 is a flowchart illustrating a method of detecting a control signal and a data value from a serial pulse signal generated using the method of FIG. 2. Referring to FIGS. 5, 6 and 8, in operation S810, the edge detection unit 510 receives a serial pulse signal via a single line.

The edge detection unit 510 samples the serial pulse signal in response to a first clock signal (i.e., the system clock signal of FIG. 1), thereby obtaining sample values. In operation S820, the edge detection unit 510 detects a rising edge of the serial pulse signal, i.e., a location where one cycle of the serial pulse signal begins, based on the sample values.

In operation S830, if the rising edge of the serial pulse signal is detected, the clock signal generation unit 520 generates a second clock signal and a third clock signal, which have been described above with reference to FIG. 5. The clock signal generation unit 520 uses the detected rising edge of the serial pulse signal as a clock reference. In operation S840, the sampling unit 530 obtains four sample values from one cycle of the serial pulse signal through sampling in response to the second clock signal.

In operation S850, the control signal detection unit 540 and the data value detection unit 550 detect a control signal and/or a data value, respectively, based on the four sample values.

If a start signal is detected from the serial pulse signal, the register controller 660-1 enables the recording of data values that are detected from cycles of the serial pulse signal that follow the start signal into a portion of the register file 660-2. If a stop signal is detected from the serial pulse signal, the register controller 660-1 disables the recording of the data values.

Figure 9:
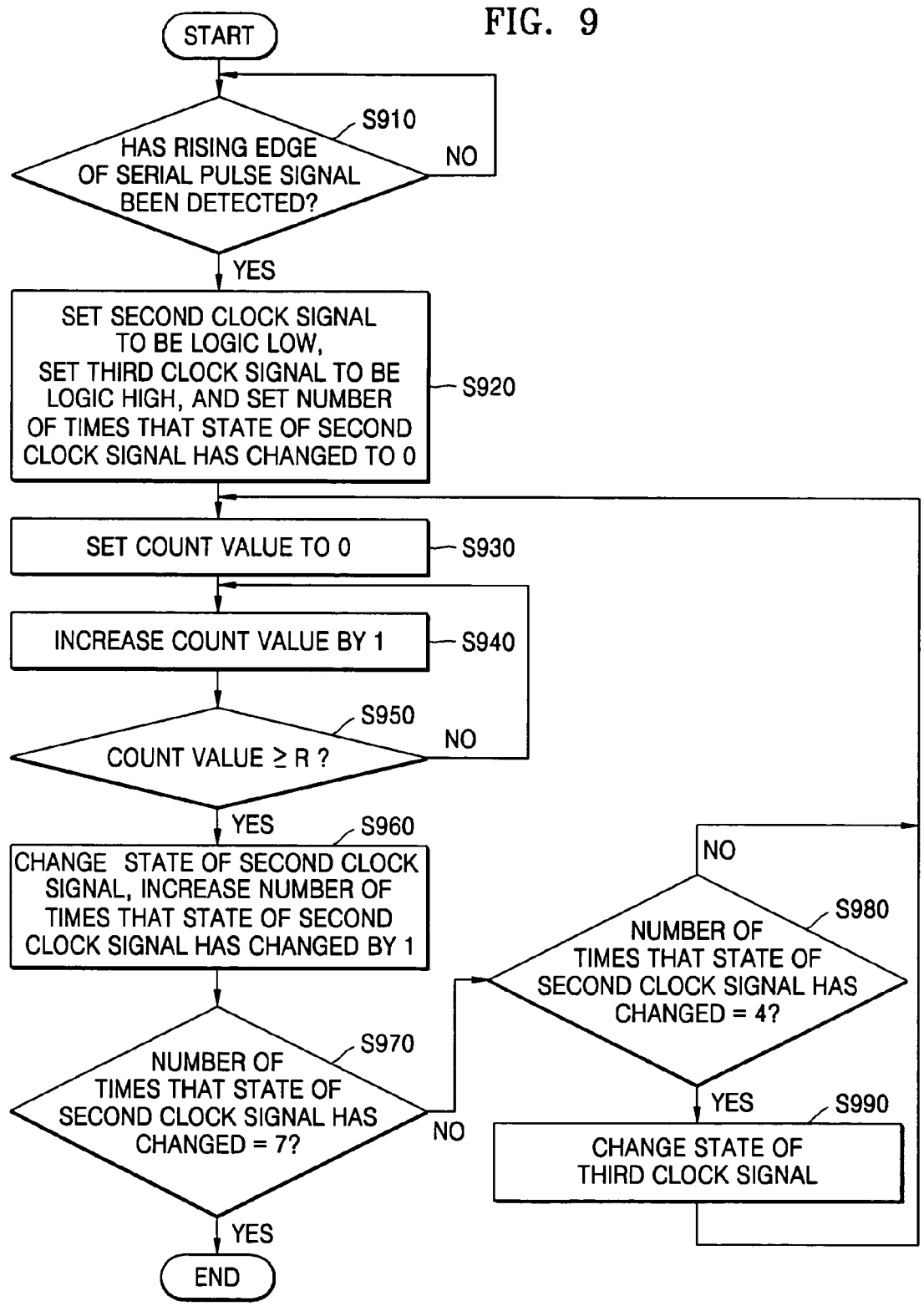
FIG. 9 is a flow chart illustrating operation S830 of FIG. 8 according to some embodiments of the present invention.

FIG. 9 is a flowchart illustrating a method of generating a clock signal, i.e., operation S830 of FIG. 8. Referring to FIGS. 5 and 9, the clock signal generation unit 520 may be realized, for example, using a digital logic circuit, rather than by using a PLL or a DLL. Therefore, the clock signal generation unit 520 can be miniaturized by as much as the size of a PLL or DLL and can consume less energy than a clock signal generation unit having a PLL or DLL.

In operation S910, the edge detection unit 510 detects a rising edge of a serial pulse signal. In operation S920, if the rising edge of the serial pulse signal is detected, the clock signal generation unit 520 sets initial values for the state of a second clock signal, the state of a third clock signal, and the number of times that the state of the second clock signal has changed. Accordingly, the second clock signal is set to be logic low, the third clock signal is set to be logic high, and the number of times that the state of the second clock signal has changed is set to be 0. The second clock signal may change between a data value of 0 and a data value of 1.

In operation S930, the clock signal generation unit 520 sets a count value to 0. The count value is the number of pulses counted of a first clock signal (i.e., the system clock signal of FIG. 1). In operation S940, whenever a pulse of the first clock signal is counted, the clock signal generation unit 520 increases the count value by 1. If the count value is smaller than R of FIG. 7B, in operation S950, the method returns to operation S940 so that the clock signal generation unit 520 counts another pulse of the first clock signal and then increases the count value by 1.

The count value is compared with R, rather than (R+F), in operation S950 because the difference between R and (R+F) is not large. Thus, in the present embodiment, F is ignored, although F may be taken into account in other embodiments of the present invention.

If the count value is greater than R in operation S950, the clock signal generation unit 520 changes the state of the second clock signal and increases the number of times that the state of the second clock signal has changed by 1 in operation S960. Accordingly, the state of the second clock signal is changed from a logic low state to a logic high state, the count value is reset to zero and the number of times that the state of the second clock signal has changed is increased to 1.

If the number of times that the state of the second clock signal has changed is smaller than 7 in operation S970, the clock signal generation unit 520 determines whether the state of the second clock signal has changed four times in operation S980. If the number of times that the state of the second clock signal has changed is not 4, operations S930 through S980 are repeated.

If the number of times that the state of the second clock signal has changed is 4 in operation S980, the clock signal generation unit 520 changes the state of the third clock signal from a logic high state to a logic low state in operation S990, and then operations S930 through S980 are repeated. Once the number of times that the state of the second clock signal has changed is equal to 7 operations end for that particular cycle of the serial pulse signal. However, it will be understood that the operations of FIG. 9 are repeated for each cycle T of the serial pulse signal in order to continually generate the second and third clock signals.

It will be appreciated that the above-described exemplary embodiments may be modified in numerous ways without departing from the scope of the present invention. By way of example, the serial pulse clock signal may be divided into more or less than four sections. Likewise, different patterns may be used to represent different data values and/or different control signals. Similarly, the types of control signals may differ from those described herein, and more than two different control signals may be provided. Also, the data need not always be represented as binary data. Likewise, the clock signal may be embedded into the serial pulse signal in various alternative ways such as, for example, by using a specific falling edge of the serial pulse signal. The data signal may also be based on certain leading edges, or certain falling edges, or a combination thereof, of the serial pulse signal.

By way of example, in another exemplary embodiment of the present invention, each cycle of the serial pulse signal may be divided into five sections, a, b, c, d and e, as opposed to the four sections used in the above-described embodiments. A pattern of 10000 represents a data value of one, a pattern of 11000 represents a data value of zero, a pattern of 11100 represents a start signal and a pattern of 11110 represents a stop signal. It will be appreciated that numerous other modifications to the embodiments are possible.

As described above, according to embodiments of the present invention, a data value and a clock reference can be transmitted via a single line by adjusting the location of an edge of a serial pulse signal and can be reconstructed from the serial pulse signal afterwards. Thus, it is possible to reduce the costs of a data communication system. In addition, it is possible to connect a sending terminal and a receiving terminal with simple interconnections by enabling the data communication system to communicate with a smaller number of pins.

According to embodiments of the present invention, such control signals as a start signal and a stop signal may be transmitted together, and thus it becomes easier for a receiving party to convert a serial pulse signal into parallel data.

According to embodiments of the present invention, the clock signal may be generated using a digital logic, instead of using a PLL or DLL. Thus, it is possible to reduce the size and/or power consumption of the data communication system.

While the present invention has been particularly shown and described with reference to particular embodiments thereof, it will be understood by those of ordinary skill in the art that various changes in form and details may be made therein without departing from the spirit and scope of the present invention as defined by the following claims.

What is claimed is:

1. A method of communicating a clock signal, digital data, and control data via a single communication line using a data communication apparatus, the method comprising:
   providing a serial pulse signal over the single communication line,
   wherein the serial pulse signal is formed by combining a plurality of cycles, and either one of the digital data or the control data are recorded within each respective cycle of the serial pulse signal,
   wherein the digital data comprises data 0 and data 1, and the control data comprises a start signal and a stop signal,
   wherein each cycle of the serial pulse signal is subdivided into a plurality of sub-intervals, and data contained in the plurality of sub-intervals has a value indicating one of the data 0, the data 1, the start signal, or the stop signal,
   wherein the clock signal is embedded in the serial pulse signal as at least some of the rising edges or the falling edges of the serial pulse signal, and
   wherein the digital data or control data is embedded in the serial pulse signal based on an edge pattern which is determined by the locations of other of the rising edges and/or the falling edges of the serial pulse signal,
   wherein the providing of the serial pulse signal is performed by a processor.

2. The method of claim 1, wherein the clock signal comprises the rising edge of the serial pulse signal in each cycle of the serial pulse signal and wherein the different possible data values of the data signal may be identified based on the locations of the falling edges of the serial pulse signal.

3. The method of claim 1, wherein the serial pulse signal is generated by a master device and transmitted via the single communication line to a slave device.

4. The method of claim 1, wherein the clock signal is embedded by transitioning the pulse signal between a low state and a high state at the beginning of a specific sub-interval of each cycle of the serial pulse signal.

5. A method of transmitting a clock signal, digital data, and control data via a serial pulse signal over a single communication line using a data communication apparatus, the method comprising:
   subdividing at least some of the cycles of the serial pulse signal into a plurality of sub-intervals;
   embedding either the digital data or the control data in the plurality of sub-intervals of each of the respective subdivided cycles of the serial pulse signal, wherein the digital data comprises data 0 and data 1, and the control data comprises a start signal or a stop signal, and data contained in the sub-intervals has a value indicating one of the data 0, the data 1, the start signal, or the stop signal; and
   embedding the clock signal in the plurality of sub-intervals of each of the subdivided cycles of the serial pulse signal; and
   transmitting the serial pulse signal with the embedded data and embedded clock signal over the single communication line,
   wherein the digital data and the control data is recorded within each of the subdivided cycles of the serial pulse signal, and the digital data and the control data is identified by an edge pattern which is determined by locations of rising edges and/or falling edges of the serial pulse signal, and
   wherein the subdividing of the at least some of the cycles, the embedding of data, the embedding of the clock signal, and the transmitting of the serial pulse signal are performed by a processor.

6. The method of claim 5, wherein the data embedded in each of the subdivided cycles of the serial pulse signal comprises one data bit or one control signal.

7. The method of claim 5, wherein the data signal is embedded in the second and third sub-intervals of each of the subdivided cycles of the serial pulse signal.

8. The method of claim 5, wherein embedding the clock signal comprises transitioning the pulse signal between a low state and a high state at the beginning of a specific sub-interval of each cycle of the serial clock signal.

9. The method of claim 8, wherein the clock signal is embedded as a transition between a low state and a high state at the beginning of the first sub-interval.

10. A method of receiving data communications embedded in a serial pulse signal transmitted over a single communication line using a data communication apparatus, the method comprising:
    extracting a clock signal from the received serial pulse signal based on a detected cycle of a serial pulse signal; and
    extracting data from the received serial pulse signal based on values of the received serial pulse signal during a plurality of subintervals of each cycle of the received serial pulse signal,
    wherein the serial pulse signal includes a plurality of detected cycles, and
    wherein the data comprises digital data or control data, the digital data comprises data 0 and data 1 and the control data comprises a start signal and a stop signal, and the data is recorded within each of the plurality of detected cycles of the serial pulse signal, and data contained in the sub-intervals has a value indicating one of the data 0, the data 1, the start signal or the stop signal, and the data is identified by an edge pattern which is determined by locations of rising edges and/or falling edges of the serial pulse signal,
    wherein the extracting of a clock signal and the extracting of a data signal are performed by a processor, and
    wherein extracting the data signal from the received serial pulse signal comprises:
    generating a second clock signal the state of which varies whenever a predetermined number of pulses of a first clock signal are counted subsequent to detection of the beginning of a cycle of the serial pulse signal;
    generating a predetermined number of sample values from each cycle of the serial pulse signal in response to the second clock signal; and
    determining data values and/or control signals embedded in each respective cycle of the received serial pulse signal based on the generated sample values.

11. The method of claim 10, wherein the frequency of the second clock signal is at least twice the frequency of the serial pulse signal.

12. A data communication apparatus for receiving a clock signal and a data signal via a single communication line, comprising:
    a clock cycle extraction unit that extracts a clock signal from a serial pulse signal received over the single communication line; and
    a data extraction unit that extracts a data signal from the serial pulse signal received over the single communication line,
    wherein at least some of a plurality of cycles of the serial pulse signal are subdivided into a plurality of sub-intervals,
    wherein the data signal comprises digital data and control data, and the digital data comprises data 0 and data 1 and the control data comprises a start signal and a stop signal, and respective data contained in the plurality of sub-intervals has a value indicating one of the data 0, the data 1, the start signal or the stop signal, and
    wherein the data signal is recorded within each of the subdivided cycles of the serial pulse signal as an edge pattern which is determined by locations of rising edges and/or falling edges of sub-intervals of each subdivided cycle of the serial pulse signal,
    wherein the clock cycle extraction unit comprises an edge detection unit which is configured to detect a rising edge of a serial pulse signal,
    wherein the data extraction unit comprises a clock signal generation unit which is configured to generate a clock signal whose state varies whenever a predetermined number of pulses of an external clock signal are counted after the rising edge of the serial pulse signal is detected, and
    wherein the data extraction unit further comprises a sampling unit which is configured to generate a predetermined number of sample values from a cycle of the serial pulse signal in response to the generated clock signal.

13. The data communication apparatus of claim 12, wherein the data extraction unit further comprises a data value detection unit which is configured to detect a data value recorded within the cycle of the serial pulse signal based on the sample values.

14. The data communication apparatus of claim 13, wherein the data value detection unit comprises:
    a data value 0 detector;
    a data value 1 detector;
    a start signal detector; and
    a stop signal detector.

15. The data communication apparatus of claim 12, wherein the sampling unit comprises a plurality of flipflops which are configured to extract the sample values from the serial pulse signal in response to the clock signal generated by the clock signal generation unit.

16. A data communication method using a data communication apparatus comprising:
    transmitting at least one cycle of a serial pulse signal in series via a single line, wherein:
    a rising edge of the serial pulse signal is set to designate the beginning of the cycle of the serial pulse signal; and
    a falling edge of the serial pulse signal within the cycle of the serial pulse signal is set according to a data value recorded within the cycle of the serial pulse signal,
    detecting the rising edge of the serial pulse signal received via the single line;
    generating a clock signal whose state varies whenever a predetermined number of pulses of an external clock signal are counted following the detection of the rising edge of the received serial pulse signal;
    extracting a predetermined number of sample values from the cycle of the received serial pulse signal in response to the generated clock signal; and
    detecting the data value recorded within the cycle of the received serial pulse signal based on the sample values,
    wherein the transmitting of at least one cycle of a serial pulse signal is performed by a processor.

17. The data communication method of claim 16, wherein the falling edge of the serial pulse signal is set at a predetermined location in the cycle of the serial pulse signal based on a control signal and/or the data value recorded within the cycle of the serial pulse signal.

18. The data communication method of claim 17, wherein the control signal is one of a start signal and a stop signal.

19. A data communication apparatus comprising:
    an edge detection unit which is configured to detect a rising edge of a serial pulse signal;
    a clock signal generation unit which is configured to generate a clock signal whose state varies whenever a predetermined number of pulses of an external clock signal are counted after the rising edge of the serial pulse signal is detected;

a sampling unit which is configured to generate a predetermined number of sample values from each cycle of the serial pulse signal in response to the generated clock signal; and a data value detection unit which is configured to detect a value of data recorded within the cycle of the serial pulse signal based on the sample values, wherein the data comprises digital data and control data, and the digital data comprises data 0 and data 1 and the control data comprises a start signal and a stop signal, and the data contained in the sample values indicates one of the data 0, the data 1, the start signal or the stop signal, wherein the data is recorded within the cycle of the serial pulse signal, and the value of the data is identified by an edge pattern which is determined by locations of rising edges and/or falling edges of the serial pulse signal.

20. The data communication apparatus of claim 19, wherein the location of a falling edge of the serial pulse signal within each cycle of the serial pulse signal is based on a data signal embedded within each respective cycle of the serial pulse signal.

21. The data communication apparatus of claim 19, wherein the edge detection unit comprises a Schmidt trigger circuit.

22. The data communication apparatus of claim 19, wherein the edge detection unit further comprises a plurality of flipflops which are configured to extract the sample values from the serial pulse signal in response to the external clock signal.

23. The data communication apparatus of claim 19, wherein the sampling unit comprises a plurality of flipflops which are configured to extract the sample values from the serial pulse signal in response to the clock signal generated by the clock signal generation unit.

24. The data communication apparatus of claim 19, wherein the data value detection unit comprises:

a data value 0 detector: and a data value 1 detector.

25. The data communication apparatus of claim 19 further comprising a control signal detection unit.

26. The data communication apparatus of claim 25, wherein the control signal detection unit comprises:

a start signal detector; and a stop signal detector.

* * * * *